No. 788,908. PATENTED MAY 2, 1905.
F. D. HOPKINS.
GUN SIGHT.
APPLICATION FILED SEPT. 30, 1904.
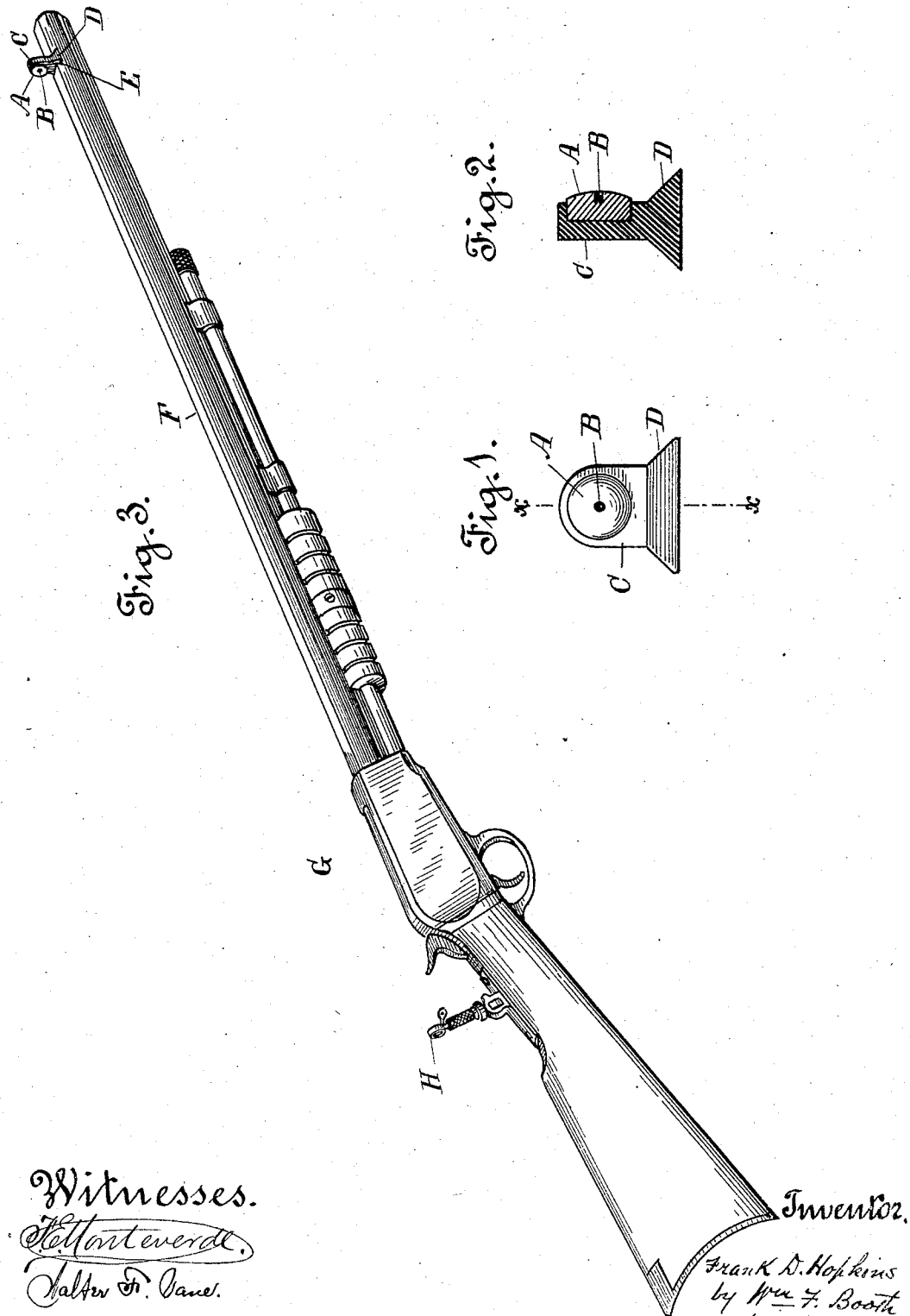

No. 788,908. Patented May 2, 1905.

UNITED STATES PATENT OFFICE.

FRANK D. HOPKINS, OF SAN FRANCISCO, CALIFORNIA.

GUN-SIGHT.

SPECIFICATION forming part of Letters Patent No. 788,908, dated May 2, 1905.

Application filed September 30, 1904. Serial No. 226,656.

*To all whom it may concern:*

Be it known that I, FRANK D. HOPKINS, a citizen of the United States, residing in the city and county of San Francisco, State of California, have invented certain new and useful Improvements in Gun-Sights; and I do hereby declare the following to be a full, clear, and exact description of the same.

My invention relates to the class of gun-sights, and especially to those adapted for front sights.

The objects of my invention are to insure quickness of sight, accuracy of aim, and facility of both sight and aim under various conditions of light.

My invention consists of a sight having a spot surrounded by a visually-contrasting field.

Referring to the accompanying drawings, Figure 1 is a front elevation, enlarged, of the sight mounted in a frame. Fig. 2 is a vertical section of the same on line $x\ x$ of Fig. 1. Fig. 3 is a view showing its application to a rifle.

The sight is composed of a suitable piece having a field A within which is the spot B, the field and spot visually contrasting, preferably by means of color, using the word "color" to include both black and white. Contrasting colors of any kind may be employed, the greater the contrast the better, for which purpose the best form of the sight is that here shown—to wit, the field A being white and the spot B black. The spot, as seen in Fig. 2, is not a perforation through the sight, so that it as well as the field is opaque. The spot may have any desired shape, though the circular shape here shown is deemed the best.

The field A entirely surrounds the spot B, though the shape of the boundary of the field is not essential. It may be triangular, rectangular, rhomboidal, or, as here shown, circular, or any shape, provided that it surrounds the spot.

The sight may be made of any suitable material—bone, ivory, porcelain, celluloid, or enameled metal will answer.

Any suitable frame adapted for the particular gun to which the sight is to be applied may be used. For the sake of the present illustration I have shown the sight as projecting slightly from the face of a standard C, the beveled foot D of which is fitted to a dovetailed slot E in the barrel F of the rifle G, as seen in Fig. 3. In this figure H is the rear sight of the rifle, which may be of any character.

The sight being opaque and appreciably large is adapted for binocular vision only. If the gun be held to the right shoulder, the right eye views the spot B through the rear sight H, while the left eye has an unobstructed view of the object aimed at. If now the two eyes be turned on their axes to focus the lines of vision in a point on the object aimed at, it is evident that the spot B must lie within the line of vision of the right eye, and the gun must point to said object. Therefore the endeavor to bring the spot B into line with the point on the object aimed at must, if successful, carry it into the line of converging vision. Success in this is made possible by the unobstructed vision of the left eye, which seeing the object clearly and the right eye seeing the spot enables the gunner to superimpose the spot on the object, binocular vision causing the field and the frame to become apparently transparent, thus eliminating them and leaving the spot alone to fill the vision, while the visual contrast between the field and the spot has the effect of making said spot very conspicuous. Rapidity and accuracy of aim are thus gained, and both may be had under wide extremes of light, because the conspicuous spot may be alined with the well-seen object in lights wherein ordinary sights cannot be distinguished at all.

Having thus described my invention, what I claim as new, and desire to secure by Letters Patent, is—

1. A binocular front sight for guns of a size to render it incapable of use with a single eye, and having a sighting-spot surrounded by a visually-contrasting opaque field.

2. A binocular front sight for guns constructed in size and of a form to render it incapable of use with a single eye, and having a sighting-spot surrounded by a field of contrasting color.

3. A binocular front sight for guns constructed in size and of a form to render it incapable of use with a single eye, and having a black sighting-spot and a surrounding white opaque field.

In witness whereof I have hereunto set my hand.

FRANK D. HOPKINS.

Witnesses:
    WALTER F. VANE,
    D. B. RICHARDS.